(12) United States Patent
Kaneider et al.

(10) Patent No.: US 12,510,628 B2
(45) Date of Patent: Dec. 30, 2025

(54) GROUND-PENETRATING RADAR SCANNER WITH BALANCED UWB DIRECTIONAL COUPLER

(71) Applicant: LEICA GEOSYSTEMS AG, Heerbrugg (CH)

(72) Inventors: Wilfried Kaneider, Rankweil-Brederis (AT); Stefano Di Bene, Cascina (IT); Alessandro Simi, Leghorn (IT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 355 days.

(21) Appl. No.: 18/235,500

(22) Filed: Aug. 18, 2023

(65) Prior Publication Data

US 2024/0061072 A1    Feb. 22, 2024

(30) Foreign Application Priority Data

Aug. 19, 2022 (EP) ..................................... 22191336

(51) Int. Cl.
*G01S 7/03* (2006.01)
*G01S 7/298* (2006.01)
(Continued)

(52) U.S. Cl.
CPC ................ *G01S 7/03* (2013.01); *G01S 7/298* (2013.01); *G01S 13/0209* (2013.01);
(Continued)

(58) Field of Classification Search
CPC ........ G01S 7/03; G01S 7/298; G01S 13/0209; G01S 13/885; G01S 7/034; G01S 7/021;
(Continued)

(56) References Cited

U.S. PATENT DOCUMENTS 2,586,993 A    2/1952  Riblet
6,501,414 B2  12/2002  Arndt et al.
(Continued)

FOREIGN PATENT DOCUMENTS

CN    110611145 B    7/2020
CN    116960595 A  * 10/2023 .............. H01P 5/184
(Continued)

OTHER PUBLICATIONS

Original and machine translation of CN-116960595-A.*
(Continued)

*Primary Examiner* — Ladimir Magloire
*Assistant Examiner* — Anna K. Gosling
(74) *Attorney, Agent, or Firm* — Maschoff Brennan

(57) ABSTRACT

A ground-penetrating radar (GPR) scanner for investigating a sub-surface, wherein the GPR scanner comprises an antenna assembly configured for transmitting and receiving ultra-wide band (UWB) signals. The GPR scanner further comprises a directional coupler, a UWB signal generator configured for providing outgoing UWB signals through the directional coupler to the antenna assembly, a UWB signal sampling unit configured for receiving incoming UWB signals from the antenna assembly through the directional coupler, and an impedance. The directional coupler is configured as a balanced UWB directional coupler. It comprises a first port configured for receiving positive outgoing UWB signals from the UWB signal generator and a second port configured for receiving negative outgoing UWB signals from the UWB signal generator, wherein the second port is balanced with the first port.

17 Claims, 5 Drawing Sheets

(51) Int. Cl.
  *G01S 13/02* (2006.01)
  *G01S 13/88* (2006.01)
  *H01P 5/18* (2006.01)
  *H05K 1/02* (2006.01)

(52) U.S. Cl.
  CPC .............. *G01S 13/885* (2013.01); *H01P 5/18* (2013.01); *H05K 1/0243* (2013.01); *H05K 1/0245* (2013.01); *H05K 2201/10098* (2013.01)

(58) Field of Classification Search
  CPC . G01S 7/282; G01S 7/285; H01P 5/18; H01P 5/185; H05K 1/0243; H05K 1/0245; H05K 2201/10098
  See application file for complete search history.

(56) References Cited

U.S. PATENT DOCUMENTS

2002/0175849 A1* 11/2002 Arndt ................... F41H 11/12
                                                           342/194
2019/0219435 A1    7/2019 Schultheiss et al.

FOREIGN PATENT DOCUMENTS

WO       2006/015436 A1    2/2006
WO    WO-2014153263 A1 *   9/2014  ........... G01S 13/885

OTHER PUBLICATIONS

Allen Podel, "Use these latest techniques to improve your GHz circuits," EDN, vol. 119, Issue 1, pp. 56-60 (Jan. 5, 1974).

Hyeong-Seok Jang, et al., "Transmit/Receive Isolator for UHF RFID Reader with Wideband Balanced Directional Coupler," 2009 Asia Pacific Microwave Conference, pp. 233-236 (Dec. 7, 2009).

Konrad Janisz, et al., "Three-section asymmetric differentially-fed broadband coupled-line directional coupler," 2018 International Conference on Electromagnetics in Advanced Applications (ICEAA), pp. 19-21 (Sep. 10, 2018).

Extended European Search Report dated Feb. 13, 2023 as received in Application No. 22191336.1.

* cited by examiner

GROUND-PENETRATING RADAR SCANNER WITH BALANCED UWB DIRECTIONAL COUPLER

FIELD

The present disclosure relates to a ground-penetrating radar (GPR) scanner for investigating a sub-surface.

BACKGROUND

Radar devices emit electromagnetic energy and therefore qualify for non-destructive testing, e.g. wherein radar devices are embodied as structure scanners and/or ground-probing radar devices. Ground penetrating radar (GPR) or sometimes referred to wall penetrating radar (WPR) or ground probing radar (also GPR) is a technology that uses the travel time and amplitude or strength of emitted radar signals the reflections of which are sampled with antennas. High frequency antennas are used for shallow depths and small targets (e.g. concrete), and they provide a relatively high resolution. Low frequency antennas are used for deep depths, large targets, for example in the fields of utility, geology, and archaeology, and they provide a relatively low resolution but also less "clutter".

The travel time in a specific material is indicated by its permittivity which is expressed with the respective dielectric constant. For example, air has a dielectric constant of 1 and provides very fast travel times of radar signals. Materials with higher dielectric constants (for example water: around 80) only allow slower travel times. Most other materials are between these two extremes. Different materials also have a different quality of radar signals reflected from them (so called "signatures" or "bandwidth signatures").

Many GPR scanners known from the prior art are consisting of separate transmit (TX) and receiving (RX) antennas, which concept is referred to in literature as bi-static antenna design. Each of these antennas in the bi-static arrangement demands a physical minimum dimension in order to operate in a proper and performant way suitable for GPR. The physical dimension of these separate antennas limit the possibilities to reduce the size of GPR scanners.

To realize a significant reduction of size of a GPR scanner, one could utilize a single antenna for both TX and RX of the radar signals, which concept is referred to in literature as mono-static antenna design. In a GPR which is based on a mono-static antenna design it is however necessary to separate transmitted signals from received signals and to reduce undesired reflections from internal interfaces from and to the antenna as much as possible in order to get the best performance for a GPR scanner.

To separate TX signals from RX signals, the use of a directional coupler is known in the technical field of radio frequency (RF). As a matter of course, directional couplers may as well be applicable in some cases of bi-static designs.

State of the art directional couplers are usually designed as modular blocks with standard interfaces that are commonly used with a defined impedance (e.g. 50 Ohm) referenced to ground signals. However, these standardized solutions are not optimized for antennas of GPR scanners which have a specific design based on symmetric signals with impedances very different than 50 Ohm and they would result in less performant implementations due to higher internal reflections and reduced dynamic range within a GPR scanner.

SUMMARY

Therefore, it is an object to provide an improved GPR scanner. It is a particular object to provide a radar front end for a GPR scanner that allows superior compactness and performance over known GPR implementations.

The disclosure provides a balanced ultra wide band (UWB) directional coupler for a GPR scanner with an improved UWB directional coupler structure, particularly optimized for a mono-static GPR antenna design.

Further advantages relate to: (a) the ability to interface with balanced interfaces under the avoidance of waveguide crossings from or to the directional coupler ports, in particular the ability to interface with an impedance of the GPR antenna, e.g. with 100-Ohm impedance building blocks; (b) the reduction of internal "reflections" within a GPR RF front end (especially interfacing a UWB antenna); (c) keeping the advantage of the balanced scheme about the "immunity" from external interferences; (d) facilitating identical directivity and coupling performance as an unbalanced setup.

The disclosure relates to a ground-penetrating radar (GPR) scanner for investigating a sub-surface, the GPR scanner comprising an antenna assembly configured for transmitting and receiving ultra-wide band (UWB) signals, a directional coupler, a UWB signal generator configured for providing outgoing UWB signals through the directional coupler to the antenna assembly, a UWB signal sampling unit configured for receiving incoming UWB signals from the antenna assembly through the directional coupler, and an impedance.

By way of example, the GPR scanner further comprises a controller configured for interpreting the incoming UWB signals received by the UWB signal sampling unit.

According to one aspect, the directional coupler is configured as a balanced UWB directional coupler and comprises: a first port configured for receiving positive outgoing UWB signals from the UWB signal generator; a second port configured for receiving negative outgoing UWB signals from the UWB signal generator, the second port being balanced with the first port; a third port and a fourth port both connected to the impedance, the fourth port being balanced with the third port; a fifth port configured for outputting the positive outgoing UWB signals to the antenna assembly and for receiving positive incoming UWB signals from the antenna assembly; a sixth port configured for outputting the negative outgoing UWB signals to the antenna assembly and for receiving negative incoming UWB signals from the antenna assembly, the sixth port being balanced with the fifth port; a seventh port configured for outputting the positive incoming UWB signals to the UWB signal sampling unit; and an eighth port configured for outputting the negative incoming UWB signals to the UWB signal sampling unit, the eighth port being balanced with the seventh port.

By way of example, ports being balanced with each other provide for a balanced waveguide or a balanced signal pair by arranging and configuring the ports such that a circuit comprising two conductors of the same type is provided, wherein both conductors have equal impedances along their lengths and equal impedances to an electrical potential (e.g. the ground). The two conductors are thus configured to carry signals with opposing amplitudes—e.g. a "+" signal and a "−" signal of symmetric nature—from a signal source to an input of a differential device, e.g. a transformer or input of a differential amplifier.

One advantage of a balanced waveguide is its good rejection of common mode noise and interference (from the outside) when fed to a differential device. This is in contrast to an unbalanced waveguide, which uses a single conductor to transfer a signal asymmetrically from a source to an input of a device, e.g. a single ended amplifier. Unbalanced waveguides are thus more susceptible to noise and interference (from the outside).

By way of example, impedance is provided by a resistor having a reference impedance of more than 50 Ohm.

In some embodiments, the directional coupler comprises a first waveguide structure and a second waveguide structure separated from the first waveguide structure by a printed circuit board (PCB).

In some embodiments, the first waveguide structure has a first saw tooth or corrugated (e.g. sinusoidal) shape and the second waveguide structure has a second saw tooth or corrugated shape.

In some embodiments, the second saw tooth or corrugated shape is mirroring the first saw tooth or corrugated shape.

In some embodiments, the second saw tooth or corrugated shape corresponds to the first saw tooth or corrugated shape in a flipped orientation.

In some embodiments, the waveguide structures are printed onto or applied to opposite sides of the PCB.

In some embodiments, the waveguide structures are comprised by corresponding pads which are attached to opposite sides of the PCB.

In some embodiments, the GPR scanner further comprises a conductive layer, in particular a ground (GND) layer, each between a respective pad and the PCB.

In some embodiments, the ports are comprised by the waveguide structures and connected to the PCB.

In some embodiments, the PCB comprises vias for UWB PCB transitions. For example, vias connect individual ports from one side of the PCB to the other. This may allow an advantageous interfacing to a SMD component with balanced ports on one side of the PCB.

In some embodiments, the PCB has a thickness of less than 2 mm. In particular, the PCB has a thickness of less than 1.6 mm, More particularly the PCB has a thickness of less than 1.0 mm or less than 0.5 mm. For example, a waveguide structure utilizing a UWB PCB via transition in combination with a smaller PCB thickness (due to its overall more discrete nature of the structure) introduces less distortions on UWB signals. A further advantage is the smaller physical size of the UWB PCB (e.g. less material, less weight, less material costs, etc.).

In some embodiments, the GPR scanner further comprises a low noise amplifier (LNA) connected to the seventh and eighth port and configured for receiving the positive and negative pulses and outputting them to the pulse UWB signal sampling unit.

In some embodiments, the directional coupler is configured to access an amplitude and a delay of the incoming UWB signals.

In some embodiments, the antenna assembly comprises an antenna configured for both transmitting and receiving the UWB signals, or wherein the antenna assembly comprises a first antenna and a second antenna, the first antenna configured for transmitting the UWB signals and the second antenna configured for receiving the UWB signals.

In some embodiments, the GPR scanner further comprises an analog-to-digital converter (ADC) configured for converting the incoming UWB signals into digital signals.

BRIEF DESCRIPTION OF THE DRAWINGS

By way of example only, preferred embodiments will be described more fully hereinafter with reference to the accompanying figures, wherein.

DETAILED DESCRIPTION

Figure 1:
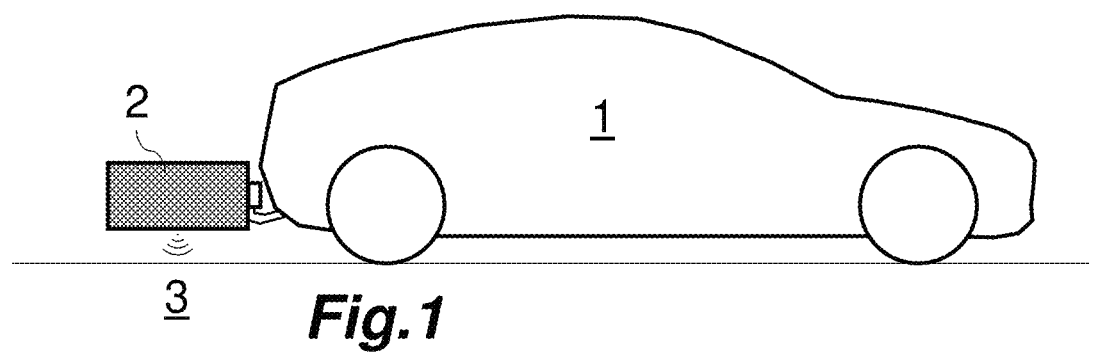
FIGS. 1-3 show embodiments of GPR scanners with different exemplary scopes of application.

FIG. 1 shows a vehicle 1 carrying on its tow hitch a GPR scanner 2 as an embodiment. Such an arrangement is often used for scanning the sub-surface 3 of a pavement in order to check e.g. whether there are any cavities or foreign material which could cause road damage. Other applications of a GPR scanner involve finding buried utilities and cable installations.

Figure 2:
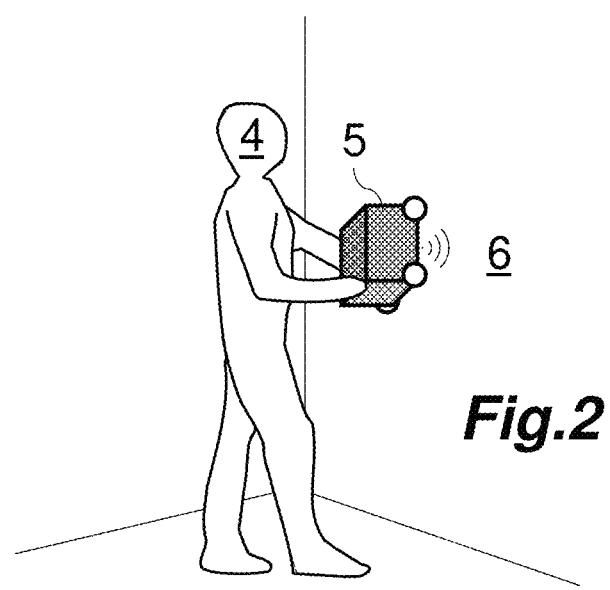

FIG. 2 shows a surveyor 4 carrying a hand-held GPR scanner 5 as an embodiment. These hand-held GPR scanners are often used for scanning the sub-surface 6 of a wall in order to locate object within or behind the wall surface, e.g. water pipes, power cables, reinforcement bars, or pre-stressed tendon cables. By locating such elements, the surveyor 4 knows where or where not to drill depending on e.g. whether he wants to drill a hole for attaching something to the wall, or whether he wants to drill a hole for accessing the element (e.g. water pipe or power cable) in the sub-surface.

Figure 3:
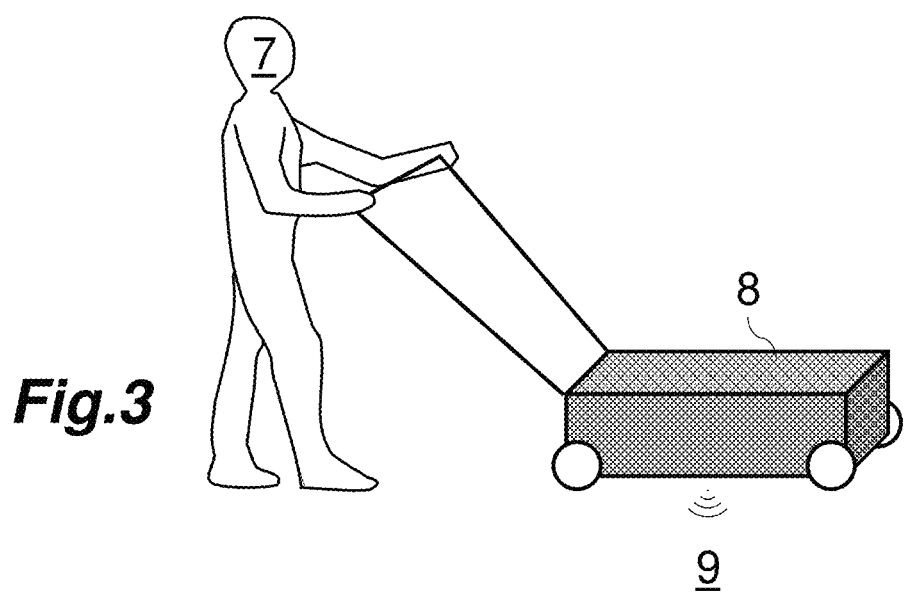

FIG. 3 shows a surveyor 7 pushing or pulling a GPR scanner 8 as an embodiment. These "lawnmower"-type of GPR scanners are often used for scanning the sub-surface 9 of e.g. historical sites or concrete ground surfaces in order to locate or analyze points of interests such as archaeological items, tunnels, pipes, or simply the concrete quality.

Figure 4:
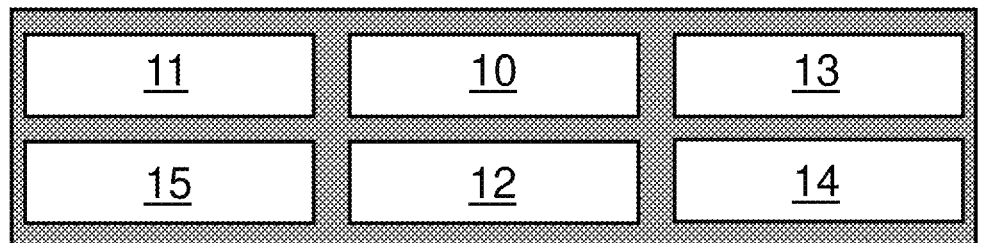
FIG. 4 shows an exemplary configuration of an embodiment of a GPR scanner.

FIG. 4 shows an exemplary, schematic configuration of such a GPR scanner 2 or 5 or 8. It houses at least an antenna assembly 12, a directional coupler 10, a UWB signal generator 11, a UWB signal sampling unit 13, a controller 15, and a resistor 14.

Figure 5:
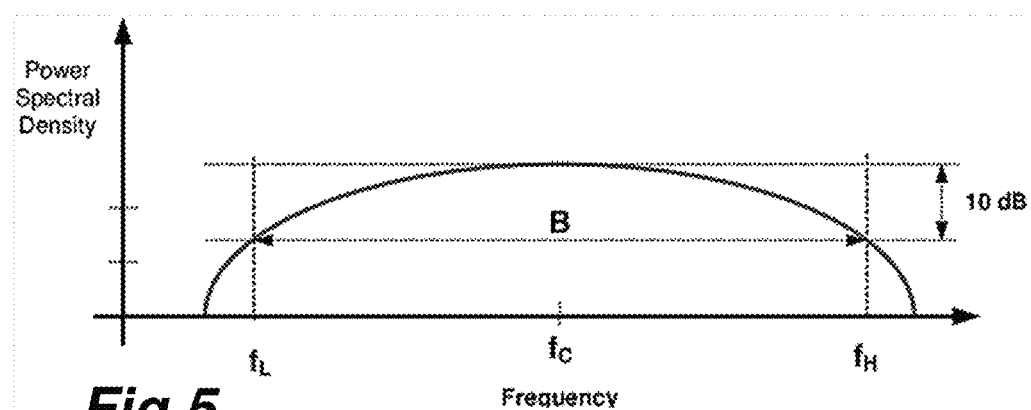
FIG. 5 illustrates a definition of the ultra-wide band (UWB) frequency spectrum.

FIG. 5 illustrates a definition of the ultra-wide band (UWB) frequency spectrum which is used in GPR scanners. The UWB bandwidth B is the frequency band bounded by the points that are 10 dB below the highest radiated emission, as based on the complete transmission system including the antenna. The upper boundary is designated $f_H$ and the lower boundary is designated $f_L$. See Code of Federal Regulations (§ 15.503, 47 CFR Ch. I (10-1-20 Edition)) of FCC rules and regulations regarding unlicensed transmissions.

Figure 6:
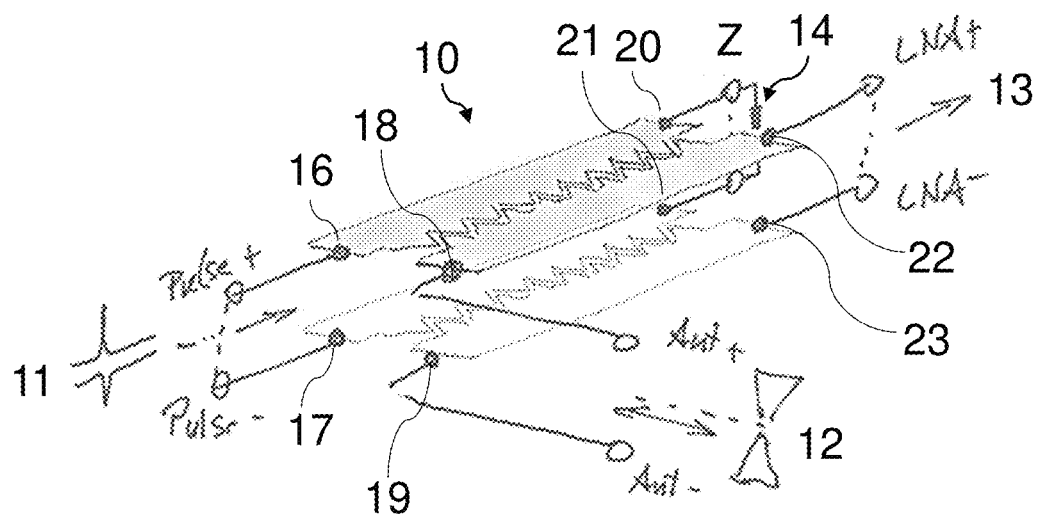
FIG. 6 shows a balanced UWB directional coupler arrangement which has interfaces to GPR building blocks and which is exemplarily used for some embodiments of a GPR scanner.

FIG. 6 shows, as an embodiment of the directional coupler, a balanced UWB directional coupler 10 arrangement which is configured to interface to GPR building blocks such as in this case: a signal generator 11 (e.g. pulse generator), an antenna 12, an amplification (e.g. low noise amplifier, LNA) block 13, sampling block 15 (not shown) subsequent to the LNA, and a resistor 14 with a reference impedance Z, wherein the GPR building blocks 11-13 are not shown here. The disclosure allows a very compact design (for example 16×16×1.6 mm size).

In particular, the reference impedance, e.g. 100 Ohm, is defined by the even and odd waves propagating along the coupling structure. The UWB signal generator 11, which can be connected to the ports 16 and 17, may be configured for providing outgoing UWB signals with a frequency of between 0.5 and 4.5 GHz, but the disclosure is not limited to this spectrum. The antenna 12, connectable to the coupler 10 by the ports 18 and 19, may be embodied as a monostatic antenna or a bistatic antenna. In the monostatic case, the antenna assembly is a transceiver, i.e. configured for both transmitting and receiving UWB signals. In the bistatic case, the antenna assembly comprises a transmission antenna and a reception antenna.

The reference impedance 14 is connected to the directional coupler by the ports 20 and 21 and the LNA is connected to the directional coupler by the ports 22 and 23. In other words, the "ports" as mentioned herein are waveguide interfaces. The UWB signals may be pulses, as labelled here in FIG. 6, but may alternatively follow a modulation of stepped frequency, frequency sweep, or noise radar.

The exemplary UWB directional coupler 10 comprises two waveguide structures of which the first one is mirror-symmetric to the second one. In other embodiments, the shapes of the two waveguide structures are not symmetric, but e.g. 180° flipped so that they are both structurally identical in the production.

The shown coupler 10 allows both even mode and odd mode: Even and odd modes are the two main modes of propagation of the signal through a coupled transmission line pair. Odd mode impedance is defined as impedance of a single transmission line when the two lines in a pair are driven differentially (with signals of the same amplitude and opposite polarity). Even mode impedance is defined as impedance of a single transmission line when the two lines in a pair are driven with a common mode signal (the same amplitude and the same polarity). In particular, the disclosure achieves a good coupling of around −10 dB and a high directivity of around ca. 20 dB.

Figure 7:
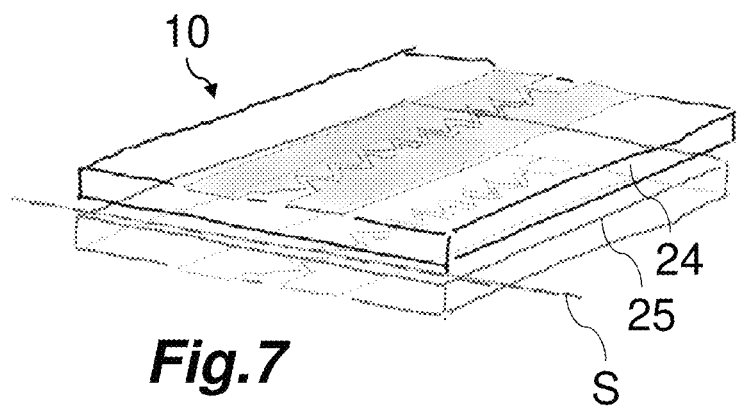
FIG. 7 shows a balanced UWB directional coupler exemplarily used in some embodiments of a GPR scanner.
Figure 10:
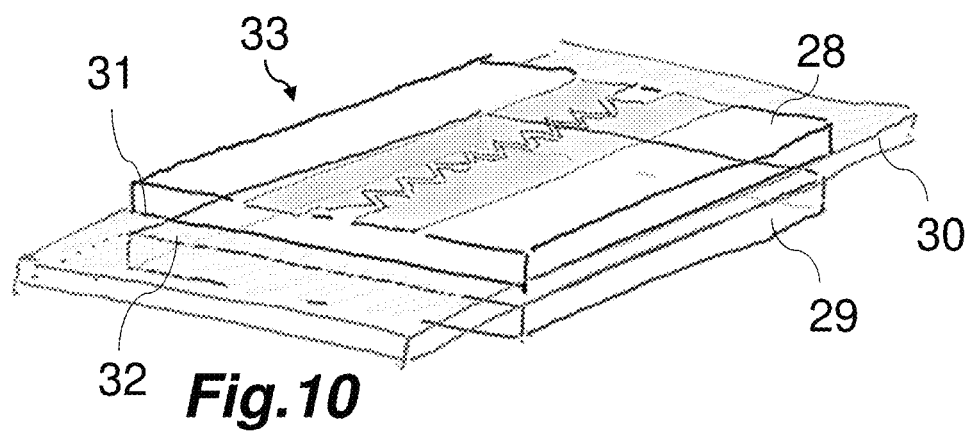
FIG. 10 shows another balanced UWB directional coupler which is implemented on a substrate and which is exemplarily used in some embodiments of a GPR scanner.

The embodiments of the directional coupler as shown in FIGS. 6, 7, and 10 are embodied with a sawtooth or castellated design, which is optional. Such a design improves the achievement of the desired wideband and matching performance.

Figure 8:
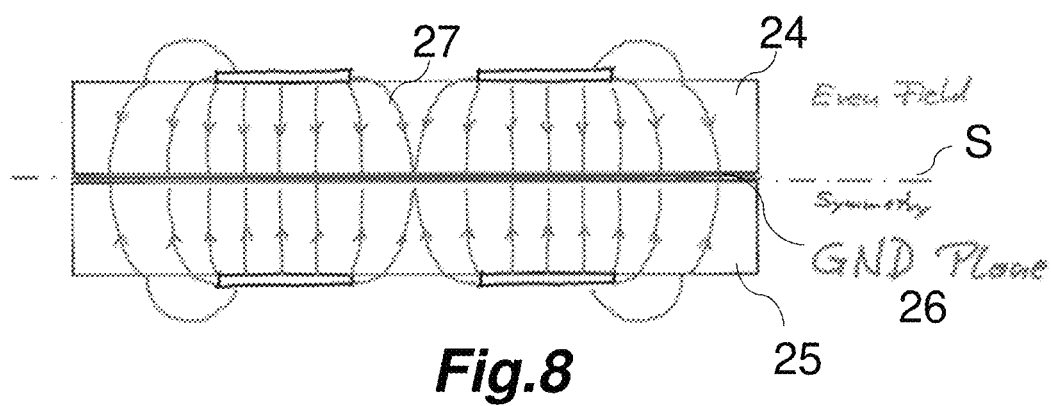
FIGS. 8 and 9 show even and odd fields of the directional coupler shown in FIG. 7.
Figure 9:
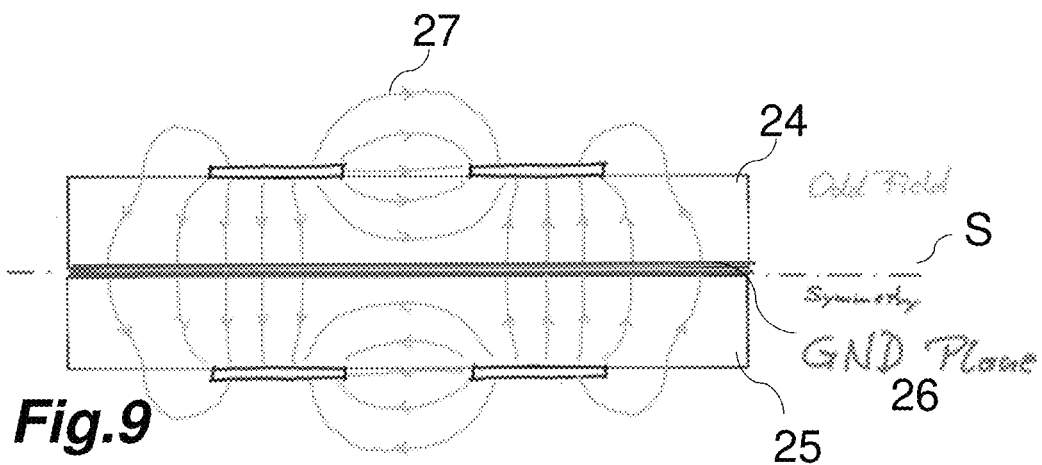

Referring now to FIG. 7, the two directional coupler layers ("waveguide structures") known from FIG. 6 can be applied or printed on carrier pads 24 and 25 and, in particular, the respective sides are symmetric as is indicated with the axis S. FIGS. 8 and 9 show a particularly specified version of the balanced coupler 10 from FIG. 7 with an even field (FIG. 8) and odd field (FIG. 9) in that it comprises an optional GND layer 26 between the pads 24 and 25. The symmetry properties can be applied in line with the Maxwell equations that exploit the GND boundary in the center of the UWB directional coupler 10 and double the nominal impedance on the ports. The boundary caused by this conductive GND layer 26 makes sure that the signals are maintained and that the field lines 27 run vertically. The GND layer 26 can be embodied as a copper foil.

Figure 11:
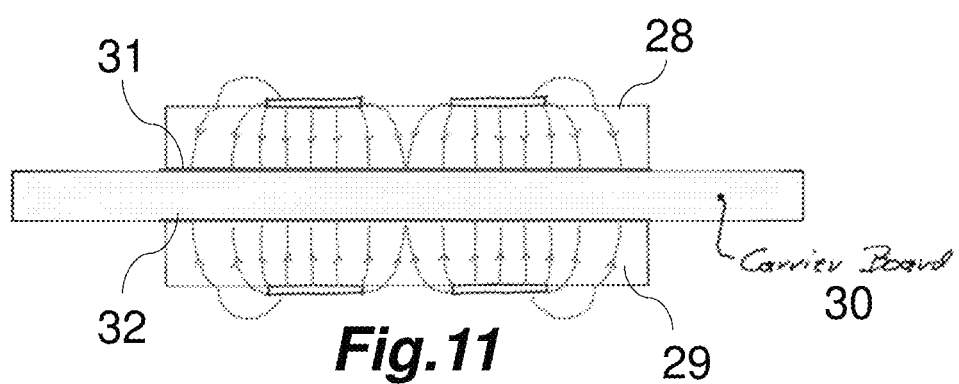
FIGS. 11 and 12 show even and odd fields of the directional coupler shown in FIG. 10.
Figure 12:
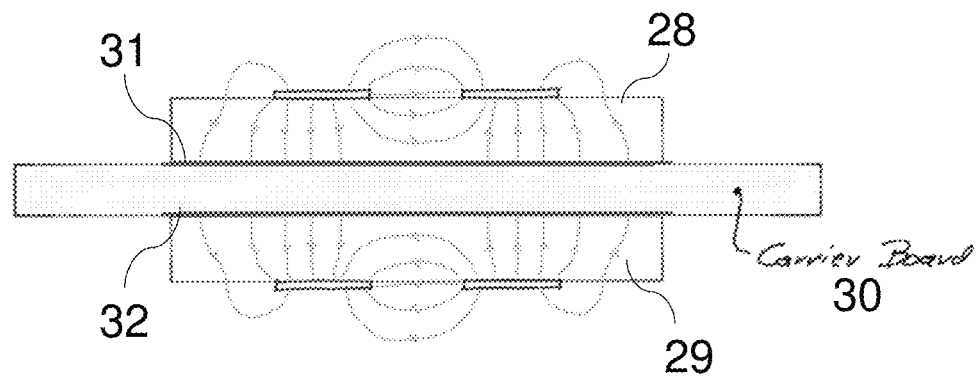

FIG. 10 shows a layered or stacked "sandwich" structure of two unbalanced UWB directional coupler layers 28 and 29 populated on a substrate 30 (i.e. carrier PCB) with GND boundaries 31 and 32 which realizes a balanced UWB directional coupler 33. Accordingly, FIGS. 11 and 12 show even and odd fields of the balanced UWB directional coupler 33. The shape of the even and odd fields is kept maintained by the GND layers. The stacked design allows to interface to typical GPR front end building blocks (UWB signal generator, Antenna, LNA/gain-block or directly a sampling unit) with balanced interfaces, e.g. by soldering a connection between the components.

Adding two GND layers allows to "tear apart" the top and bottom unbalanced UWB directional coupler parts with defined reference impedance, for example of 50 Ohm, and allows the introduction of a carrier substrate (or PCB). As a whole the structure implements a balanced UWB directional coupler with a reference impedance 2×50 Ohm=100 Ohm.

In other embodiments, which are not illustrated in the drawings, the waveguide structures are directly printed onto or applied to the opposite sides of the PCB, which amounts to the coupler 33 in FIG. 10 only without the pads 28 and 29.

Figure 13:
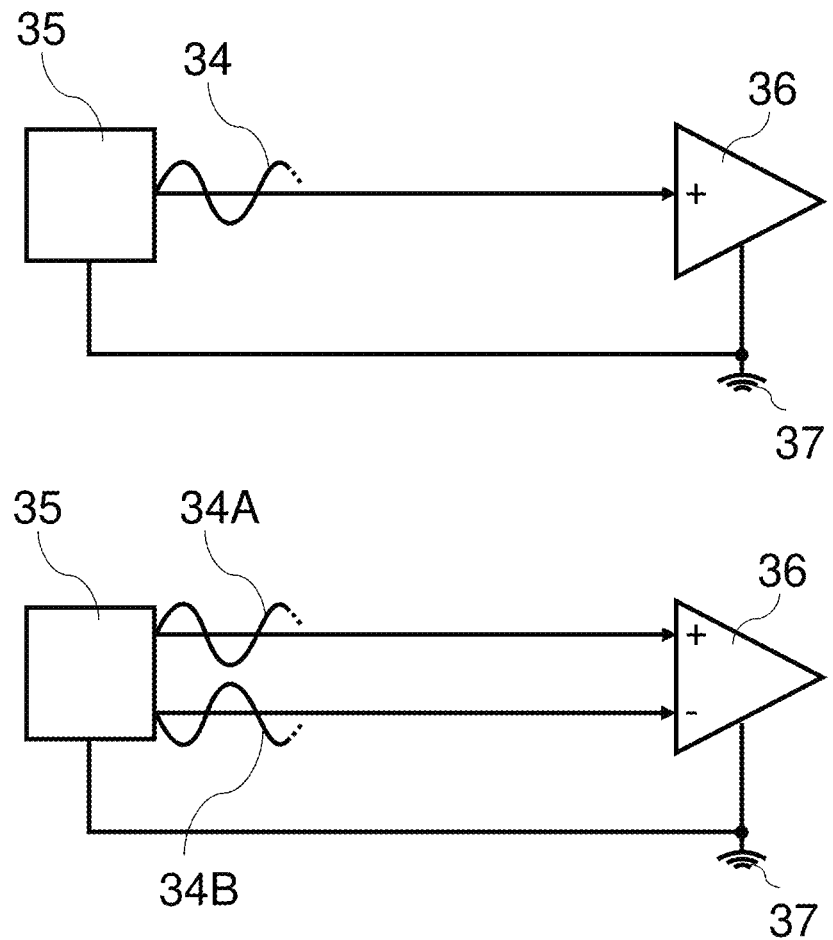
FIG. 13 schematically depicts an exemplary balanced circuit against an exemplary unbalanced circuit.

FIG. 13 schematically depicts an exemplary balanced circuit (bottom of the figure) against an exemplary unbalanced circuit (top of the figure). In the shown unbalanced circuit, a single conductor is used to transfer a signal 34 asymmetrically from a source 35 to an input 36 of a device, wherein the source 35 and the input 36 are grounded to a reference potential 37. In contrast, the shown balanced circuit uses two conductors of the same type, wherein both conductors have equal impedances along their lengths and equal impedances to the reference potential 37 (e.g. the ground). One of the two conductors carries a "+" signal 34A and the other conductor carries a mirrored "−" signal 34B. In other words, the balanced circuit is symmetric with respect to the source 35 whereas the unbalanced circuit asymmetric with respect to the source 35.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A ground-penetrating radar (GPR) scanner for investigating a sub-surface, the GPR scanner comprising
   an antenna assembly configured for transmitting and receiving ultra-wide band (UWB) signals,
   a directional coupler,
   a UWB signal generator configured for providing outgoing UWB signals through the directional coupler to the antenna assembly,
   a UWB signal sampling unit configured for receiving incoming UWB signals from the antenna assembly through the directional coupler, and
   an impedance,
   wherein the directional coupler is configured as a balanced UWB directional coupler and comprises:
      a first port configured for receiving positive outgoing UWB signals from the UWB signal generator,
      a second port configured for receiving negative outgoing UWB signals from the UWB signal generator, the second port being balanced with the first port,
      a third port and a fourth port both connected to the impedance, the fourth port being balanced with the third port,
      a fifth port configured for outputting the positive outgoing UWB signals to the antenna assembly and for receiving positive incoming UWB signals from the antenna assembly, a sixth port configured for outputting the negative outgoing UWB signals to the antenna assembly and for receiving negative incoming UWB signals from the antenna assembly, the sixth port being balanced with the fifth port, a seventh port configured for outputting the positive incoming UWB signals to the UWB signal sampling unit, and an eighth port configured for outputting the negative incoming UWB signals to the UWB signal sampling unit, the eighth port being balanced with the seventh port.

2. The GPR scanner according to claim 1, wherein the directional coupler comprises a first waveguide structure and a second waveguide structure separated from the first waveguide structure by a printed circuit board (PCB).

3. The GPR scanner according to claim 2, wherein the first waveguide structure has a first saw tooth or corrugated shape and the second waveguide structure has a second saw tooth or corrugated shape.

4. The GPR scanner according to claim 3, wherein the second saw tooth or corrugated shape is mirroring the first saw tooth or corrugated shape.

5. The GPR scanner according to claim 3, wherein the second saw tooth or corrugated shape corresponds to the first saw tooth or corrugated shape in a flipped orientation.

6. The GPR scanner according to claim 2, wherein the waveguide structures are printed onto or applied to opposite sides of the PCB.

7. The GPR scanner according to claim 2, wherein the waveguide structures are comprised by corresponding pads which are attached to opposite sides of the PCB.

8. The GPR scanner according to claim 7, comprising a conductive layer, in particular a ground (GND) layer, each between a respective pad and the PCB.

9. The GPR scanner according to claim 2, wherein the ports are comprised by the waveguide structures and connected to the PCB.

10. The GPR scanner according to claim 2, wherein the PCB comprises vias for UWB PCB transitions.

11. The GPR scanner according to claim 2, wherein the PCB has a thickness of less than 2 mm.

12. The GPR scanner according to claim 1, comprising a low noise amplifier (LNA) connected to the seventh and eighth port and configured for receiving the positive and negative pulses and outputting them to the pulse UWB signal sampling unit.

13. The GPR scanner according to claim 1, wherein the directional coupler is configured to access an amplitude and a delay of the incoming UWB signals.

14. The GPR scanner according to claim 1, wherein the antenna assembly comprises an antenna configured for both transmitting and receiving the UWB signals, or wherein the antenna assembly comprises a first antenna and a second antenna, the first antenna configured for transmitting the UWB signals and the second antenna configured for receiving the UWB signals.

15. The GPR scanner according to claim 1, comprising an analog-to-digital converter (ADC) configured for converting the incoming UWB signals into digital signals.

16. The GPR scanner according to claim 13, wherein the directional coupler is configured to access an amplitude and a delay of the incoming UWB signals.

17. The GPR scanner according to claim 13, comprising an analog-to-digital converter (ADC) configured for converting the incoming UWB signals into digital signals.

* * * * *